M. NESS.
PUMP.
APPLICATION FILED OCT. 28, 1912.

1,092,382.

Patented Apr. 7, 1914.

WITNESSES:
F. C. Matheny
E. Peterson

INVENTOR:
Martin Ness
BY
Pierre Barnes
ATTORNEY

UNITED STATES PATENT OFFICE.

MARTIN NESS, OF BOTHELL, WASHINGTON.

PUMP.

1,092,382.   Specification of Letters Patent.   Patented Apr. 7, 1914.

Application filed October 28, 1912. Serial No. 728,184.

*To all whom it may concern:*

Be it known that I, MARTIN NESS, a subject of the King of Norway, residing at Bothell, in the county of King and State of Washington, have invented certain new and useful Improvements in Pumps, of which the following is a specification.

My invention relates to that class of pumps which utilize compressed air to act directly upon a body of water to expel the same from a pumping chamber.

The object of the invention is the improvement in pumps of this character; and it consists in the novel construction and combination of devices as will be hereinafter described and claimed.

Figures 1, 2:
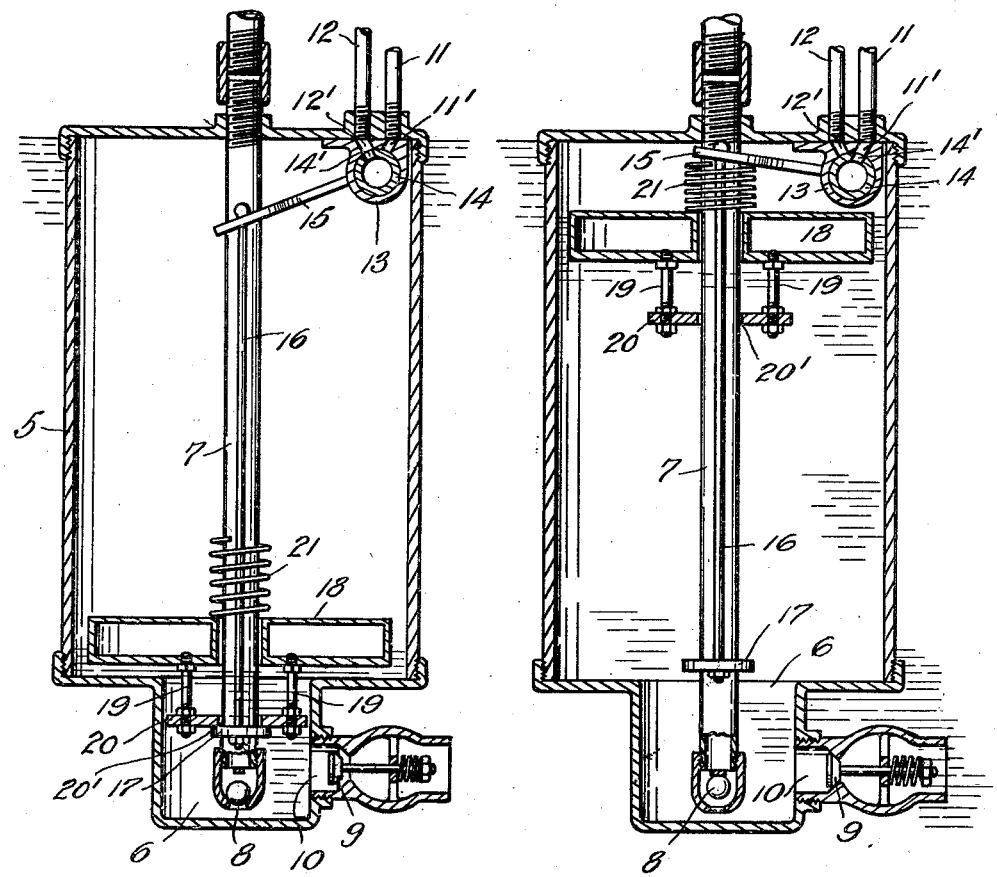
Figure 3:
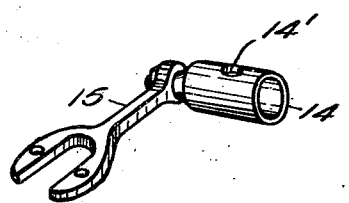

In the accompanying drawings, Figure 1 is a vertical sectional view of a pump embodying my improvements. Fig. 2 is a similar view with the valves and controlling devices therefor shown in different positions than in which they are represented in Fig. 1. Fig. 3 is a perspective view of the air-valve and the operating arm therefor.

The reference numeral 5 designates a pumping-vessel provided at its lower end with a communicating cylindrical chamber 6. Extending through said vessel and for a distance into the chamber 6 is liquid discharge pipe 7 having at its lower end an automatically acting non-return valve 8. A spring closed one-way valve 9 admits liquid into chamber 6 through an opening 10 provided in the wall of the same. Connected to the upper end of the pumping vessel are the pipes 11 and 12 through which compressed air is respectively supplied to and discharged from the pumping-vessel. The pipe 11 may be connected with an air-pump or reservoir wherefrom air under pressure is supplied to serve as the power agent whereby the pumping operation is effected. 13 represents a casing for a three-way valve 14, said casing being provided with two passages $11^1$ and $12^1$ which connect the air pipes with the bore of the valve casing. The valve 14 is formed hollow and is open at one end to have the interior cavity of the valve in continuous communication with the interior of the pumping-vessel.

In the periphery of valve 14 is a port $14^1$ which is disposed to register with the passages $11^1$ and $12^1$ when the valve is suitably rocked. Fixedly secured to valve 14 is an arm 15 having its free end forked, and depending from the latter at diametrically opposite sides of the pipe 7 are rods, such as 16, which support a ring element 17 surrounding the pipe near the lower end of the same.

18 represents a float and rigidly connected thereto by posts 19 is an annular plate 20 of an external diameter slightly less than the internal diameter of the chamber 6. The opening $20^1$ of said plate is made of a size to accommodate pipe 7 and the rods 16 to permit the plate moving unrestrainedly up and down with the float.

21 is a helical spring surrounding pipe 7 and supported by the float.

To operate the invention the vessel 5 is submerged in water. When the various operating parts occupy the positions in which they are illustrated in Fig. 1, the pressure due to the head of water surrounding the pump will cause the water to flow into the vessel through opening 10 and chamber 6 thereby elevating the float 18 while the air escapes through pipe 12. As the float approaches the upper end of the vessel, the spring 21 is brought against the forked end of the arm 15 to first compress the spring and to eventually influence the arm to act with rapidity to cause the valve 14 to be rotated into the position in which it is shown in Fig. 2, resulting in the closing of the air exhaust passage $12^1$ and the opening of the inlet passage $11^1$. Whereupon, air under pressure will enter the vessel and exerts a downward pressure upon the previously admitted body of water to drive the same through the delivery pipe 7. As the float 18 descends, the plate 20 encounters the ring 17 and carries it therewith to exert a downward pull upon the rods 16 to gradually swing valve 14 into closed position with respect to air exhaust passage $12^1$. When the plate 20, however, enters the chamber 6 the momentum of the water in its flow to the water delivery pipe drags the plate downwardly with considerable speed and in opposition to the buoyancy of the float to impart a quick opening movement of the valve 14 with regard to the air outlet passage $12^1$, to allow the air to be quickly exhausted by the replacement of water.

What I claim, is—

1. In apparatus of the class described, the combination of a pumping-vessel provided with air inlet and outlet openings, a three-way valve for controlling said openings, an arm connected to said valve, a cylindrical chamber communicating with the lower end of said vessel and provided with a water inlet, a spring closing valve for the water inlet, a water discharge pipe extending through said vessel and into said chamber, a non-return valve for said pipe, a float, an element surrounding said pipe and positioned below said float and operatively connected with said arm whereby the latter is influenced by the float in its downward movements to open the three-way valve with respect to the air outlet, and a plate secured to said float and operable within said chamber for regulating the motion of the float and the three-way valve during the referred to opening of the same.

2. In apparatus of the class described, the combination of a pumping-vessel provided with air inlet and outlet openings, a three-way valve for controlling said openings, an arm connected to said valve, a chamber communicating with the lower end of said vessel and provided with a water inlet, a valve for the water inlet, a water discharge pipe extending through said vessel and into said chamber, a non-return valve for said pipe, a float, an element positioned below said float and operatively connected with said arm whereby the latter is influenced by the float in its downward movements to open the three-way valve with respect to the air outlet, said float also serving in its upward movements to open the three-way valve for the admission of air from said outlet opening, and a spring carried by the float and engageable with said arm in the upward movements of the float for influencing the opening of the three-way valve with respect to the air inlet.

3. In apparatus of the class described, the combination of a pumping-vessel provided with air inlet and outlet openings, a three-way valve for controlling said openings, an arm connected to said valve, a cylindrical chamber communicating with the lower end of said vessel and provided with a water inlet, a spring closing valve for the water inlet, a water discharge pipe extending through said vessel and into said chamber, a non-return valve for said pipe, a float, an element surrounding said pipe and positioned below said float and operatively connected with said arm whereby the latter is influenced by the float in its downward movements to open the three-way valve with respect to the air outlet, a plate secured to said float and operable within said chamber for regulating the motion of the float and the three-way valve during the referred to opening of the same, and a spring carried by the float and engageable with said arm in the upward movements of the float for influencing the opening of the three-way valve with respect to the air inlet.

4. In apparatus of the class described, a pumping vessel provided with air inlet and outlet openings, a single valve for alternately opening and closing said openings, an arm connected to said valve, a float, a spring carried by the float, and an element suspended from said arm, said spring and element being adapted to be successively actuated by the float in the upward and downward movements of the latter thereby influencing said valve to permit the passage of air through the respective openings.

5. In apparatus of the class described, the combination of a pumping-vessel having a water inlet and provided with air inlet and outlet openings, a three-way valve for controlling said openings, an arm connected to said valve, a chamber communicating with the lower end of said vessel and provided with a water inlet, a valve for said water inlet, a pipe for the discharge of water from the lower end of said vessel, a non-return valve for said pipe, a float, and an element positioned below said float and operatively connected with said arm whereby the latter is influenced by the float in its downward movements to open the three-way valve with respect to the air outlet, said float also serving in its upward movements to open the three-way valve for the admission of air from said outlet opening.

Signed at Seattle, Wash., this 16th day of October 1911.

MARTIN NESS.

Witnesses:
 PIERRE BARNES,
 E. PETERSON.